United States Patent Office 3,517,170
Patented June 23, 1970

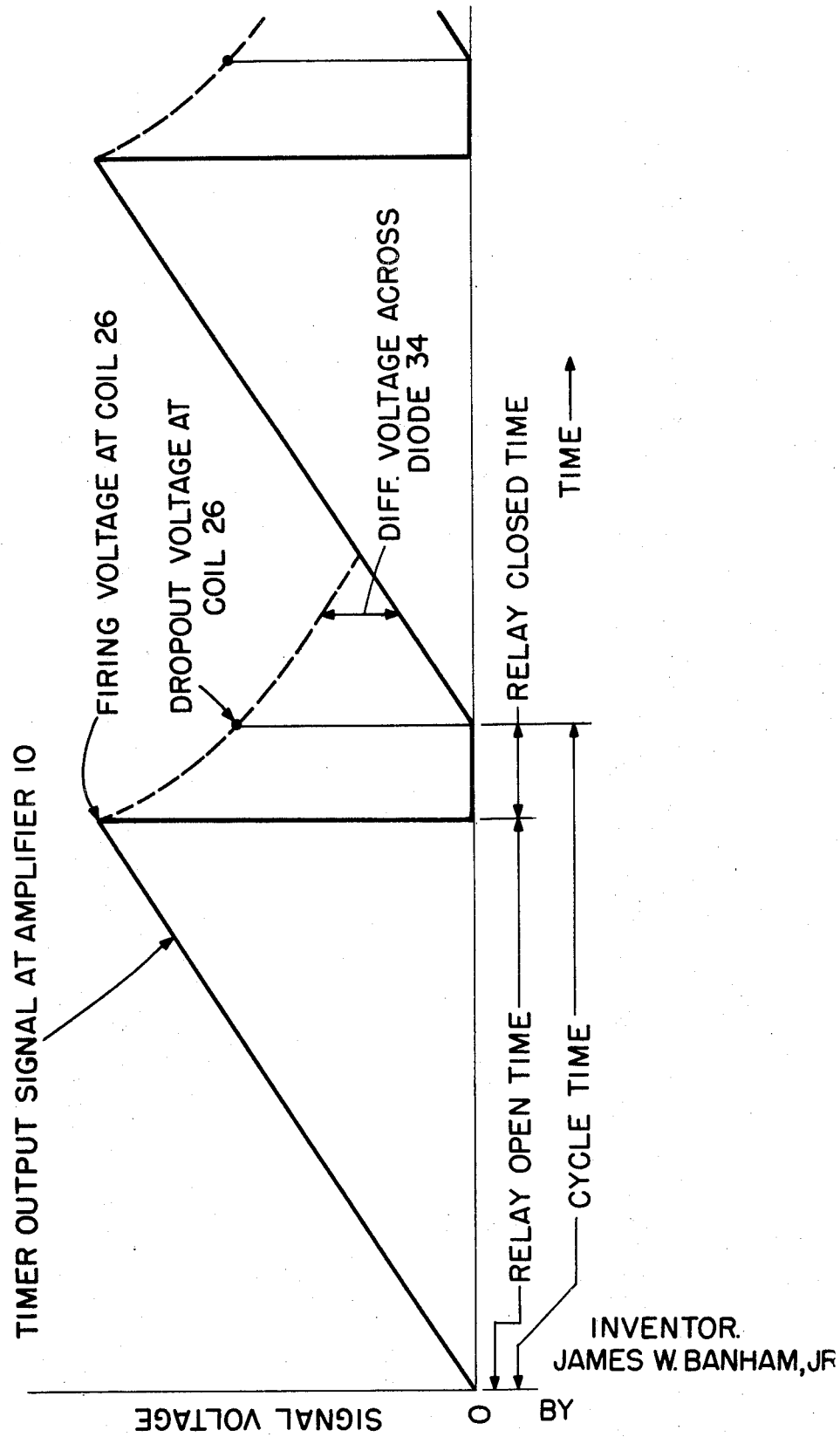

3,517,170
SYSTEM OR APPARATUS FOR OPTIMIZING THE OPERATION OF A COMBUSTION PROCESS
James W. Banham, Jr., Media, Pa., assignor to the United States of America, as represented by the Secretary of the Navy
Filed Mar. 29, 1967, Ser. No. 627,590
Int. Cl. G06g 7/18; F23n 3/00
U.S. Cl. 235—151.12                        5 Claims

ABSTRACT OF THE DISCLOSURE

Subject disclosure relates to unique apparatus in which a corrective electrical signal developed from the relative opaqueness of the products of combustion in a combustion process is used to regulate and control the input air-fuel ratio of the combustion process. The apparatus includes adjustable timing circuitry that intermittently activates and deactivates a summing amplifier. The summing amplifier provides an output signal that represents the difference between a preset potential and a potential proportional to the density of the smoke of the combustion process. The difference or error output signal of the summing amplifier is then used to control the input air-fuel ratio of the combustion process.

Background of the invention

Control apparatus or systems for regulating involved technical processes to produce the desired products or to operate a process in the most efficient and economical manner are known to the prior art. In general these systems or apparatus are designed to measure various variables resulting from a process for the purpose of controlling values of inputs for carrying out the process and it is common practice in industrial systems to employ feed back signals which are developed from the product variables resulting from the operation of a process. Such a feedback signal, for example, may be developed from the oxygen, $CO_2$ or the combustible content of smoke products resulting from a combustion process for controlling the fuel or air supply to the process, however, such devices require skilled personnel and have been found to be expensive and occasionally unreliable.

The system disclosed in Pat. 3,184,686 to Benjamin D. Stanton may be considered representative of the prior art with which the present invention is concerned in that this patent is directed to a type of control which is particularly useful for relatively simple processes having only a few product variables resulting from the process and a limited number of input values for carrying out a process. The above mentioned Stanton patent, however, effects a continuous corrective operation and differs from the present invention which is designed to effect a periodic corrective operation.

Summary of the invention

Commercial equipment is available for developing a feedback signal from the oxygen, $CO_2$ or smoke products of a combustion process. By combining the apparatus or system of the present invention with such commercial equipment the value of such a developed signal can be measured against a preset value for such product and an error or corrective signal then applied periodically to control equipment for regulating the inputs of a combustion process, such as, the air control equipment used in such a process.

Brief description of the drawings

FIG. 2 is a graph illustrating the timing cycle effected by a portion of the apparatus or system of FIG. 1.

In FIG. 1, the timing amplifier and integrating amplifier are indicated at 10 and 12, respectively, while the equipment for developing a signal from the smoke products of a combustion process is indicated at 14 and the control equipment for regulating the supply of air to the combustion process is indicated at 16. A voltage source is indicated at 18 and a first potentiometer formed of resistance 20 and potentiometer arm 22 supplies a preselected or fixed input voltage through resistor 24 to the amplifier 10.

Figure 1:
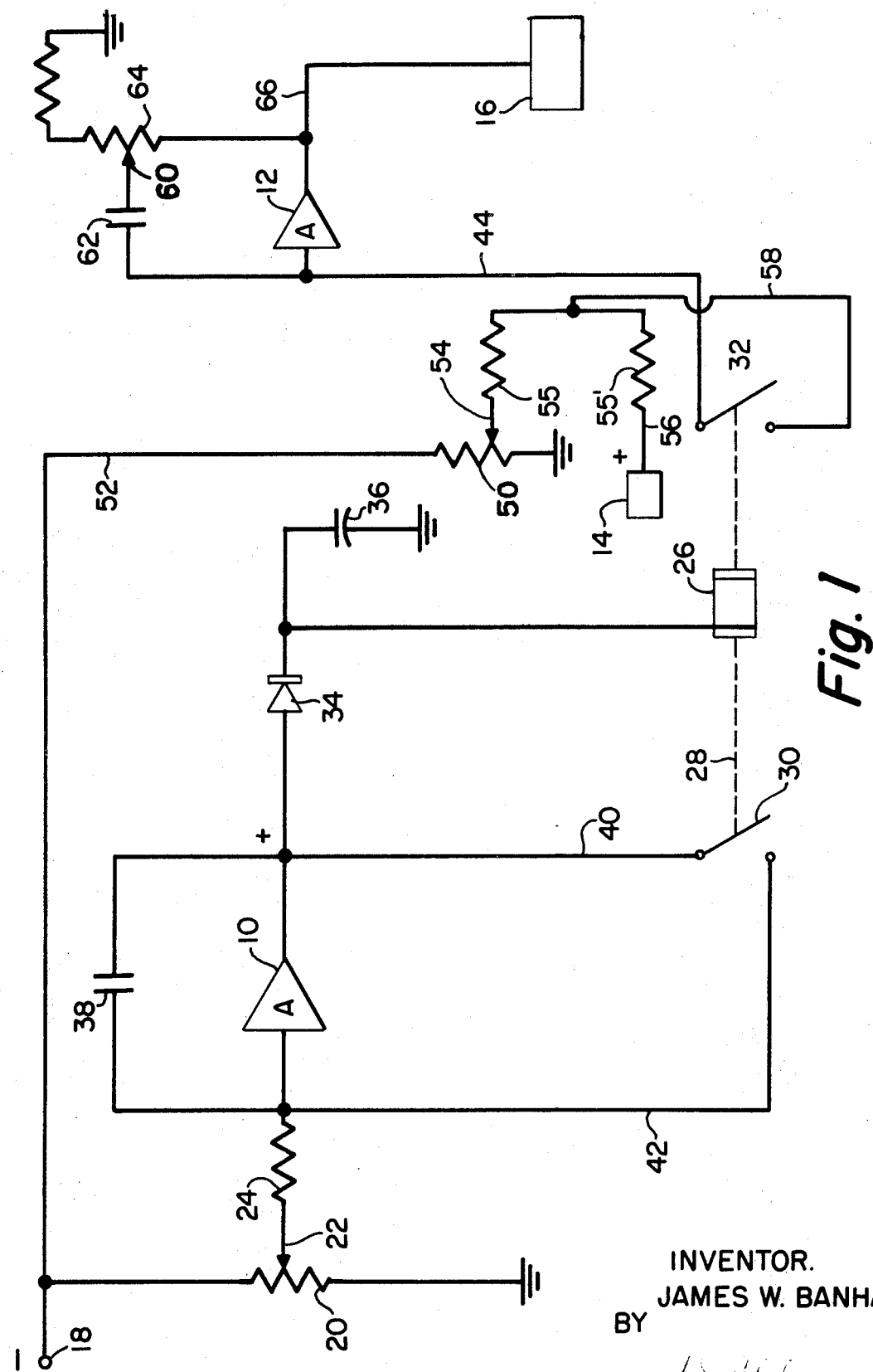
FIG. 1 of the drawing is a diagrammatic showing of the apparatus or system of the invention applied to the control of the air input to a combustion process by a signal developed from the smoke products of the process.

The amplifier 10 together with feedback capacitor 38 operates as an integrator and thus generates an output voltage for charging capacitor 36 and for operating a relay coil 26 which actuates control shaft 28 and a set of contactors 30 and 32. The integrating amplifier 10 provides an increasing voltage output until it attains the firing voltage of the relay coil 26 at which time the relay operates and the contactors 30 and 32 move to their closed positions. Closing of contact arm 30 causes discharge of capacitor 38 through lines 40 and 42. During this period the capacitor 36 discharges through the relay coil 26. The diode 34 prevents discharge from the capacitor 36 through the circuitry of amplifier 10. During the initial period of discharge of the capacitor 36 the control shaft 28 will maintain the contactors 30 and 32 in their closed positions and the signal from device 14 is transmitted to the integrating amplifier 12 through the contactor 32 as will be explained later. After the initial period of discharge of capacitor 36, the contact arms 30 and 32 return to their open position thus permitting the beginning of a new integrating cycle. An inspection of FIG. 2 illustrates the voltage-time relationship for the integrator amplifier 10 and the relay coil 26 just described.

In FIG. 1, a second potentiometer resistance 50 which is located in a line 52 from the voltage source 18 and a potentiometer arm 54 provide an arrangement for selecting a preset voltage value that represents a parameter of the combustion process, for example, the density of the smoke product from a combustion process. A line 56 is connected to the signal developing equipment 14. By connecting both the contact arm 54 and line 56 through a pair of matched resistors 55 and 55' to the fixed terminal of switch arm 32 through a line 58 the difference between the oppositely poled signals thereon is applied to the amplifier 12 when relay 26 operates. This difference or error voltage is momentarily integrated at a high rate variable in accordance with the setting of another potentiometer arm 60 of resistor 64 and capacitor 62. During the period in which the integrator amplifier 10 is inoperative, which is that initial period in which the capacitor 36 is discharging, the output signal from amplifier 12 is transmitted to the air flow controller 16 by line 66 and will change in the direction required to reduce the error signal and tend to bring the product to desired value. The operation of the apparatus is repeated until the product attains its desired value.

Obviously many modifications and variations of the present invention are possible in the light of the above teachings. It is therefore to be understood that, within the scope of the appended claims, the invention may be practiced otherwise than as specifically described.

I claim:
1. Apparatus for optimizing a combustion process, said apparatus comprising:
(a) an integrator circuit responsive to an input signal;

(b) a normally deenergized relay coupled to the output of the integrator circuit;
(c) a capacitor coupled to the output of the integrator circuit in parallel with the relay;
(d) means for discharging the integrator circuit when the relay is energized;
(e) a summing amplifier;
(f) means for applying a variable potential of one polarity to the input of the summing amplifier;
(g) means for applying a signal of the opposite polarity proportional to an output parameter of the combustion process to the input of the summing amplifier;
(h) and means coupled to the output of the summing amplifier which controls an input parameter of the combustion process.

2. The apparatus as claimed in claim 1 and further including means for varying the input signal so as to control the charging rate of the integrator circuit.

3. The apparatus as claimed in claim 1 wherein the summing amplifier includes a feedback capacitor for controlling its rate of integration.

4. The apparatus as claimed in claim 1 wherein the means for applying a signal proportional to an output parameter of the combustion process to the summing amplifier is a smoke density signal generating device.

5. The apparatus as claimed in claim 1 wherein the means which controls an input parameter of the combustion process is an air input control device.

References Cited
UNITED STATES PATENTS

| | | | |
|---|---|---|---|
| 2,753,503 | 7/1956 | Wideroe | 235—150.1 |
| 3,004,199 | 10/1961 | Sakson | 318—28 |
| 3,278,770 | 11/1966 | Shoh | 235—150.1 X |
| 3,286,144 | 11/1966 | Hill | 318—18 |

MALCOLM A. MORRISON, Primary Examiner

F. D. GRUBER, Assistant Examiner

U.S. Cl. X.R.

235—183, 150.21; 328—77, 185; 318—18, 447